US010578736B2

(12) United States Patent
Fukuman et al.

(10) Patent No.: US 10,578,736 B2
(45) Date of Patent: Mar. 3, 2020

(54) OBJECT DETECTION APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Masumi Fukuman, Kariya (JP); Motonari Ohbayashi, Nagakute (JP); Akihiro Kida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 146 days.

(21) Appl. No.: 14/918,319

(22) Filed: Oct. 20, 2015

(65) Prior Publication Data
US 2016/0116590 A1 Apr. 28, 2016

(30) Foreign Application Priority Data

Oct. 22, 2014 (JP) .................................. 2014-215097

(51) Int. Cl.
*G01S 15/00* (2006.01)
*G01S 15/931* (2020.01)
(Continued)

(52) U.S. Cl.
CPC ............ *G01S 15/931* (2013.01); *G01S 15/46* (2013.01); *G01S 15/878* (2013.01); *G01S 15/66* (2013.01);
(Continued)

(58) Field of Classification Search
CPC .......... G01S 15/96; G01S 15/46; G01S 15/93
See application file for complete search history.

(56) References Cited

U.S. PATENT DOCUMENTS 3,418,325 A   12/1968 Nigel
3,418,625 A   12/1968 Nigel
(Continued)

FOREIGN PATENT DOCUMENTS

CN   103605125   2/2014
JP   S63127179   5/1988
(Continued)

OTHER PUBLICATIONS

U.S. Appl. No. 14/880,526 and its entire file history, filed Oct. 12, 2015, Fukuman, et al.
(Continued)

*Primary Examiner* — Hovhannes Baghdasaryan
(74) *Attorney, Agent, or Firm* — Knobbe, Martens, Olson & Bear, LLP

(57) ABSTRACT

An object detection apparatus for detecting an object around a moving object by transmitting a probe wave and receiving reflections of the probe wave from the object via the plurality of ranging sensors. In the apparatus, an interaction determiner is configured to, if an object position calculated by a position calculator is within a range of a moving-object's course, determine whether or not the detected object is likely to interact with the moving object based on a lateral position of the detected object and a degree of confidence of the object position calculated by the position calculator. The lateral position of the detected object is the object position calculated by the position calculator in a direction perpendicular to a moving direction of the moving object.

12 Claims, 8 Drawing Sheets

(51) Int. Cl.
  *G01S 15/46* (2006.01)
  *G01S 15/87* (2006.01)
  *G01S 15/66* (2006.01)

(52) U.S. Cl.
  CPC ... *G01S 2015/465* (2013.01); *G01S 2015/938* (2013.01)

(56) References Cited

U.S. PATENT DOCUMENTS

| | | | |
|---|---|---|---|
| 5,122,990 A | 6/1992 | Deines | |
| 5,315,562 A | 5/1994 | Bradley | |
| 5,689,250 A | 11/1997 | Kremser | |
| 5,761,155 A | 6/1998 | Eccardt et al. | |
| 5,923,282 A | 7/1999 | Honma et al. | |
| 5,940,011 A | 8/1999 | Agravante et al. | |
| 6,289,282 B1 * | 9/2001 | Hassler | B60Q 9/006 342/455 |
| 6,434,486 B1 * | 8/2002 | Studt | G01S 7/4004 180/169 |
| 6,898,528 B2 * | 5/2005 | Zorka | G08G 1/163 180/271 |
| 7,068,155 B2 * | 6/2006 | Kade | B60T 7/22 340/435 |
| 7,202,776 B2 | 4/2007 | Breed | |
| 7,873,181 B1 * | 1/2011 | Maluf | G01S 15/93 382/100 |
| 8,108,147 B1 | 1/2012 | Blackburn | |
| 8,452,506 B2 * | 5/2013 | Groult | G01S 15/931 303/193 |
| 8,605,947 B2 | 12/2013 | Zhang et al. | |
| 8,989,944 B1 | 3/2015 | Agarwal et al. | |
| 9,221,396 B1 | 12/2015 | Zhu et al. | |
| 9,507,023 B2 * | 11/2016 | Nakano | G08G 1/166 |
| 9,541,644 B2 | 1/2017 | Hoenes et al. | |
| 2002/0047780 A1 | 4/2002 | Nishimoto | |
| 2003/0195704 A1 | 10/2003 | Sekiguchi | |
| 2004/0238249 A1 | 12/2004 | Kim | |
| 2005/0046606 A1 | 3/2005 | Yoneda | |
| 2005/0195071 A1 | 9/2005 | Ewerhart et al. | |
| 2006/0013069 A1 | 1/2006 | Wilson | |
| 2006/0031015 A1 | 2/2006 | Paradie | |
| 2006/0085177 A1 | 4/2006 | Toyama et al. | |
| 2006/0119473 A1 | 6/2006 | Gunderson et al. | |
| 2007/0176822 A1 | 8/2007 | Shirakawa | |
| 2008/0068146 A1 | 3/2008 | Cauldwell | |
| 2008/0204208 A1 | 8/2008 | Kawamata et al. | |
| 2009/0299662 A1 | 12/2009 | Fehrenbach | |
| 2010/0214872 A1 | 8/2010 | Schmid et al. | |
| 2011/0044507 A1 | 2/2011 | Strauss et al. | |
| 2011/0133917 A1 | 6/2011 | Zeng | |
| 2011/0241857 A1 | 10/2011 | Brandenburger et al. | |
| 2012/0283895 A1 * | 11/2012 | Noda | G08G 1/166 701/1 |
| 2012/0307594 A1 | 12/2012 | Enoue et al. | |
| 2014/0340993 A1 | 11/2014 | Honda | |
| 2015/0097704 A1 | 4/2015 | Kwon | |
| 2015/0310281 A1 | 10/2015 | Zhu et al. | |
| 2016/0253575 A1 | 9/2016 | Kakegawa et al. | |
| 2017/0261602 A1 | 9/2017 | Olshansky et al. | |

FOREIGN PATENT DOCUMENTS

| | | |
|---|---|---|
| JP | H06-138225 | 5/1994 |
| JP | H06-150195 | 5/1994 |
| JP | 2005-070943 A | 3/2005 |
| JP | 2008-039497 | 2/2008 |
| JP | 2008-122137 | 5/2008 |
| JP | 2013-124982 | 6/2013 |
| JP | 2014-089077 A | 5/2014 |
| JP | 2014-093039 | 5/2014 |
| JP | 2015-004562 | 1/2015 |
| KR | 2013-0119674 | 11/2013 |
| WO | WO 2005/091015 | 9/2005 |

OTHER PUBLICATIONS

U.S. Appl. No. 14/918,330 and its entire file history, filed Oct. 20, 2015, Fukuman, et al.
U.S. Appl. No. 14/887,623 and its entire file history, filed Oct. 20, 2015, Fukuman, et al.
U.S. Appl. No. 14/887,625 and its entire file history, filed Oct. 20, 2015, Fukuman, et al.
U.S. Appl. No. 14/918,373 and its entire file history, filed Oct. 20, 2015, Fukuman, et al.
U.S. Appl. No. 14/918,920 and its entire file history, filed Oct. 21, 2015, Fukuman, et al.
U.S. Appl. No. 14/919,498 and its entire file history, filed Oct. 21, 2015, Fukuman, et al.
U.S. Appl. No. 14/919,562 and its entire file history, filed Oct. 21, 2015, Fukuman, et al.
Tian Fenxia, "Pipeline Obstacle Detecting and Locating Based on Ultrasonic Waves", Southwest Jiaotong Postraduate Dissertation, Jun. 2013, TP391, p. 30.
Installation and Operation of Ship Navigation System, Beijing Institute of Technology Press, dated Aug. 2014 in 8 pages.
Chinese document, "The basic characteristtics of a multiple echo" in 8 pages.
"Study on Airborne Ultrasonic Position and Velocity Measurement of Multiple Objects Using Chirp Signal", by Sakai Ko, Kurosawa Minoru, Hirata Shinnosuke (Tokyo Institute of Technology), Orino Yuichiro (The University of Shiga Prefecture), Acoustical Society of Japan Spring Meeting, Mar. 2013, p. 1451-1452, in 4 pages.
United States Patent and Trademark Office, Office Action, U.S. Appl. No. 14/880,526, dated Jul. 6, 2017 in 12 pages.
United States Patent and Trademark Office, Final Office Action, U.S. Appl. No. 14/880,526, dated Feb. 28, 2018 in 11 pages.
United States Patent and Trademark Office, Office Action, U.S. Appl. No. 14/918,373, dated Dec. 19, 2017 in 13 pages.
United States Patent and Trademark Office, Final Office Action, U.S. Appl. No. 14/918,373, dated Apr. 9, 2018 in 9 pages.
United States Patent and Trademark Office, Office Action, U.S. Appl. No. 14/918,330, dated Oct. 20, 2017 in 13 pages.
United States Patent and Trademark Office, Final Office Action, U.S. Appl. No. 14/918,330, dated Mar. 12, 2018 in 11 pages.
United States Patent and Trademark Office, Office Action, U.S. Appl. No. 14/887,623, dated Aug. 30, 2017 in 21 pages.
United States Patent and Trademark Office, Final Office Action, U.S. Appl. No. 14/887,623, dated May 7, 2018 in 38 pages.
United States Patent and Trademark Office, Office Action, U.S. Appl. No. 14/918,920, dated Feb. 23, 2017 in 13 pages.
United States Patent and Trademark Office, Office Action, U.S. Appl. No. 14/918,920, dated Dec. 15, 2017 in 13 pages.
United States Patent and Trademark Office, Office Action, U.S. Appl. No. 14/919,562, dated Sep. 12, 2017 in 14 pages.
United States Patent and Trademark Office, Final Office Action, U.S. Appl. No. 14/919,562, dated Mar. 29, 2018 in 12 pages.
United States Patent and Trademark Office, Office Action, U.S. Appl. No. 14/887,625, dated May 10, 2018 in 26 pages.
United States Patent and Trademark Office, Notice of Allowance, U.S. Appl. No. 14/918,920, dated Apr. 11, 2018 in 7 pages.
Notice of Allowance and Fee(s) Due, U.S. Appl. No. 14/919,562, dated Aug. 1, 2018, in 11 pages.
Notice of Allowance and Fee(s) Due, U.S. Appl. No. 14/918,920, dated Jun. 11, 2018, in 11 pages.
Office Action of U.S. Appl. No. 14/880,526 dated Oct. 9, 2018.
Notice of Allowance of U.S. Appl. No. 14/918,373 dated Oct. 18, 2018.
Notice of Allowance of U.S. Appl. No. 14/918,920 dated Oct. 18, 2018.
United States Patent and Trademark Office, Advisory Action, U.S. Appl. No. 14/880,526, dated May 25, 2018, in 4 pages.
Notice of Allowance and Fee(s) Due, U.S. Appl. No. 14/887,623, dated Sep. 4, 2018, in 28 pages.
Corrected Notice of Allowance and Fee(s) Due, U.S. Appl. No. 14/887,623, dated Sep. 11, 2018, in 5 pages.
Notice of Allowance and Fee(s) Due, U.S. Appl. No. 14/887,625, dated Sep. 10, 2018, in 14 pages.

(56) References Cited

OTHER PUBLICATIONS

Office Action, U.S. Appl. No. 14/918,330, dated Sep. 11, 2018, in 14 pages.
Notice of Allowance and Fee(s) Due, U.S. Appl. No. 14/919,562, dated Dec. 26, 2018, in 9 pages.
Final Office Action for U.S. Appl. No. 14/918,330, dated Feb. 12, 2019.
Notice of Allowance for U.S. Appl. No. 14/880,526; dated Feb. 13, 2019.
Notice of Allowance for U.S. Appl. No. 14/919,562; dated Jun. 11, 2019.
Notice of Allowance for U.S. Appl. No. 14/918,373; dated Jun. 12, 2019.
Notice of Allowance for U.S. Appl. No. 14/918,330; dated Jun. 5, 2019.
Notice of Allowance for U.S. Appl. No. 14/880,526; dated May 22, 2019.

* cited by examiner

OBJECT DETECTION APPARATUS

CROSS-REFERENCE TO RELATED APPLICATION

This application is based on and claims the benefit of priority from earlier Japanese Patent Application No. 2014-215097 filed Oct. 22, 2014, the description of which is incorporated herein by reference.

BACKGROUND (Technical Field)

The present invention relates to an object detection apparatus for detecting an object around a moving-object carrying the apparatus.

(Related Art)

Conventionally, a known object detection apparatus, as disclosed in Japanese Patent Application Laid-Open Publication No. 2014-89077, includes at least one ranging sensor, such as an ultrasonic sensor or the like, mounted in a vehicle to detect an object, such as a pedestrian, an obstacle or the like, around the vehicle, and based on detection results, performs various types of controls, such as actuation of a braking device and notification to a driver, for improving vehicle driving safety.

The object detection apparatus disclosed in Japanese Patent Application Laid-Open Publication No. 2014-89077 includes a plurality of ranging sensors mounted in the vehicle to calculate a widthwise position of the object based on the principle of triangulation, where the widthwise position of the object refers to a position of the object in a widthwise or cross vehicle direction perpendicular to a traveling direction of the vehicle. If the widthwise position of the object is within the vehicle width, it is determined that the object has been detected. If the widthwise position of the object is not within the vehicle width, it is determined that the object has not been detected. Performing such a determination process can prevent erroneously detecting an object that is actually less likely to interact with the vehicle as an object that is likely to interact with the vehicle.

When the ranging sensors are used to detect an object, reflections of ultrasound waves of the ranging sensors may vary with object shapes and environments around the vehicle. Resultant variations of the reflections may cause variations in detected position of the object. Thus, despite that the position of the object calculated based on the principle of triangulation is within a range of a vehicle's course, the object may be actually out of the range of the vehicle's course. In such a case, despite that no interaction avoidance control needs to be performed, such avoidance control may be unnecessarily performed.

In consideration of the foregoing, exemplary embodiments of the present invention are directed to providing an object detection apparatus capable of preventing erroneously detecting an object that is actually less likely to interact with a moving object as an object that is likely to interact with the moving object.

SUMMARY

In accordance with an exemplary embodiment of the present invention, there is provided an object detection apparatus for detecting an object around a moving object with a plurality of ranging sensors attached to the moving object by transmitting a probe wave and receiving reflections of the probe wave from the object via the plurality of ranging sensors.

The apparatus includes: a first detector configured to detect the object based on a direct wave that is a first reflection of the probe wave from the object, the probe wave and the first reflection being respectively transmitted and received by the same ranging sensor that is a first ranging sensor that is one of the plurality of ranging sensors; a second detector configured to detect the object based on an indirect wave that is a second reflection of the probe wave from the object, the second reflection being received by a second ranging sensor that is another one of the plurality of ranging sensors; a position calculator configured to calculate an object position as a position of the object based on the detections of the first and second detectors according to the principle of triangulation; an interaction determiner configured to, if the object position calculated by the position calculator is within a range of a moving-object's course, determine whether or not the detected object is likely to interact with the moving object based on a lateral position of the detected object and a degree of confidence of the object position calculated by the position calculator, the lateral position of the detected object being the object position calculated by the position calculator in a direction perpendicular to a moving direction of the moving object.

In the case of a large variation of the detected object position, despite that the detected object is actually present at a position where the detected object is less likely to interact with the moving object, it may be determined that the detected object is likely to interact with the moving object, which may cause interaction avoidance control for avoiding the interaction between the detected object and the moving object to be unnecessarily performed. As the degree of confidence of the detected object position decreases, the variation of the detected lateral position (that is the object position in the direction perpendicular to the moving direction) may be increased. Therefore, even if it is determined that the detected object is within the range of the moving object's course, it cannot be confidently determined whether or not the detected object is in a position where the detected object is likely to interact with the moving object. Addressing this concern, the above configuration can prevent the detected object that is actually at a position where the detected object is less likely to interact with the moving object from being determined as being likely to interact with the moving object.

DESCRIPTION OF SPECIFIC EMBODIMENTS

Figure 1:
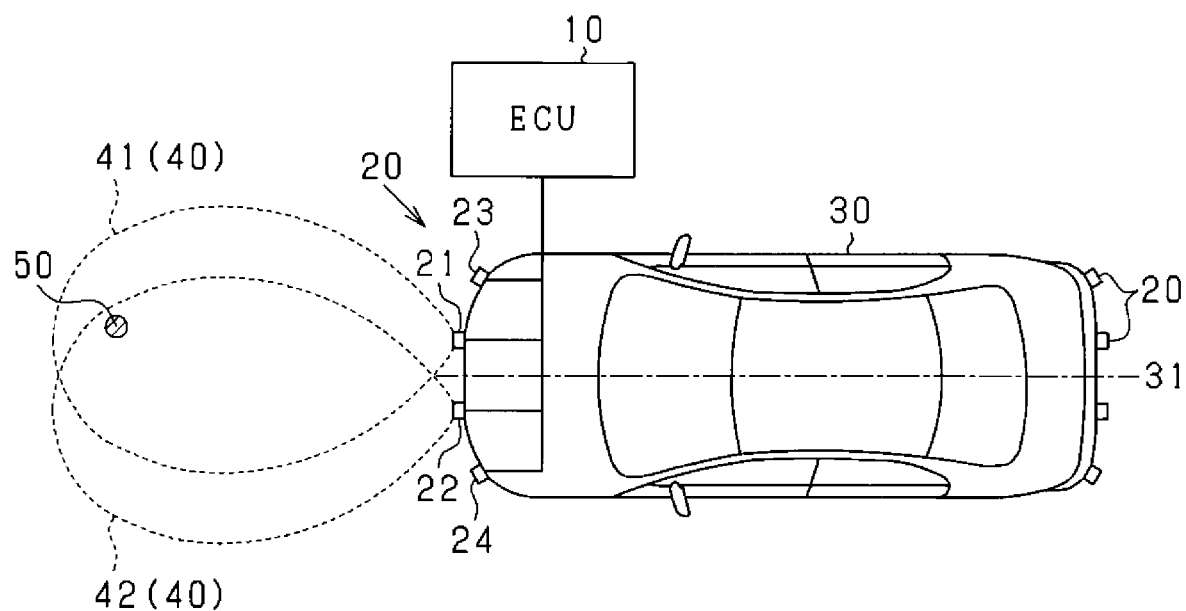
FIG. 1 is a schematic of an object detection system in accordance with a first embodiment of the present invention.

Example embodiments will now be described more fully with reference to the accompanying drawings. Example embodiments are provided so that this disclosure will be thorough, and will fully convey the scope to those who are skilled in the art. Numerous specific details are set forth such as examples of specific components to provide a thorough understanding of embodiments of the present disclosure. It will be apparent to those skilled in the art that example embodiments may be embodied in many different forms and that neither should be construed to limit the scope of the disclosure. Identical or equivalent components or components of equal or equivalent action are thereby identified by the same or similar reference numerals.

First Embodiment

An object detection apparatus mounted in a moving object in accordance with a first embodiment of the present invention will now be explained with reference to the accompanying drawings. The object detection apparatus of the present embodiment is mounted in a vehicle as the moving object and is configured to receive object sensing information from ranging sensors mounted in the vehicle to detect an object around the vehicle, such as another vehicle, a roadway construction or the like. An object detection system in accordance with the present embodiment will now be explained with reference to FIG. 1.

Each of ranging sensors 20 may be an ultrasonic sensor having a function of transmitting an ultrasonic wave at a frequency in a range of 20-100 kHz as a probe wave and a function of receiving a reflection of the probe wave from an object. In the present embodiment, four ranging sensors 20 are attached to a front portion of the vehicle 30 (e.g., a front bumper) and spaced apart from each other by a predetermined spacing in a widthwise direction of the vehicle perpendicular to the traveling direction of the vehicle 30. More specifically, the ranging sensors 20 include two center sensors (first and second sensors 21, 22) in proximity to the center line 31 of the vehicle 30 and at symmetrical positions about the center line 31, and corner sensors 23, 24 at front left and right corners of the vehicle 30. Four more ranging sensor 20 are attached to a rear portion of the vehicle 30 (e.g., a rear bumper) at similar positions, therefore including two center sensors and two corner sensors. These rear ranging sensors attached to the rear portion of the vehicle 30 have the same functions as the ranging sensors attached to the front portion of the vehicle 30. Therefore, descriptions for the rear ranging sensors 20 will not be repeated below.

For each of the ranging sensors 20, the ranging sensor has a range of direct object detection 40 such that a reflection of the probe wave transmitted by the ranging sensor from an object within the range of direct object detection 40 can be received by the ranging sensor. Any pair of adjacent ranging sensors 20 are attached to the front portion of the vehicle 30 so that the ranges of direct object detection 40 of the adjacent ranging sensors 20 at least partially overlap each other. Although only the ranges of direct object detection 41, 42 of the first and second ranging sensors (center sensors) 21, 22 are shown in FIG. 1, the corner sensors 23, 24 may also have similar ranges of direct object detection 40. Each of the ranging sensors 20 has a threshold value for amplitude of reflections. Upon receipt of the reflection having an amplitude equal to or greater than the threshold value, the ranging sensor 20 transmits object sensing information including a receipt time of the reflection to an electronic control unit (ECU) 10 as the object detection apparatus of the present embodiment.

The ECU 10 includes a microcomputer formed of CPU and various memories, such as RAM and ROM, and is configured to detect the object(s) 50 around the vehicle 30 based on the object sensing information of the object(s) 50 received from the ranging sensors 20. More specifically, the ECU 10 transmits control signals to at least one of the ranging sensors 20 every predetermined time interval (e.g., every hundreds of milliseconds) to instruct the ranging sensors 20 to transmit the probe wave. Upon receipt of the object sensing information of the object 50 from the ranging sensors 20, the ECU 10 determines the presence or absence of the object 50 around the vehicle based on the received sensing information. When it is determined that the object 50 is present around the vehicle 30, then the ECU 10 performs interaction avoidance control, such as steering angle control or deceleration control, or notification to a driver of the vehicle 30 using an audible alarm so that the vehicle 30 does not interact with the object 50.

The ECU 10 transmits transmission instructions to the ranging sensors 20 to cause each of the ranging sensors 20 to transmit an ultrasonic wave as a probe wave in a predefined sequence at predetermined time intervals. In the present embodiment, in response to the transmission instructions from the ECU 10, the first center sensor 21 transmits an ultrasonic wave and then the second center sensor 22 transmits an ultrasonic wave. Subsequently, the corner sensor 23 transmits an ultrasonic wave and then the corner sensor 24 transmits an ultrasonic wave. The probe waves are sequentially transmitted at predefined time intervals such that the sequentially transmitted probe waves do not interfere with each other. In addition, in the present embodiment, only the first received reflection at the ranging sensors 20 after the sequential transmissions of the ultrasonic waves from the ranging sensors 21, 22, 23, 24 is valid, and the second to fourth reflections received after receipt or the first received reflection are invalidated.

The ECU 10 uses the object sensing information of the object 50 received from the ranging sensors 20 to calculate a position (i.e., coordinates) of the object 50 relative to the vehicle 30 (referred to as a relative position of the object 30) using the principle of triangulation. According to the well-known principle of triangulation, the coordinates of a measurement point are calculated using a known distance between two points and distances from the two points to the measurement point. According to such principle of triangulation, the ECU 10 calculates the relative position of the object 50 based on a known distance between two adjacent ranging sensors 20 whose ranges of direct object detection 40 at least partially overlap each other and measured distances from the two adjacent ranging sensors 20 to the object 50.

Figure 2:
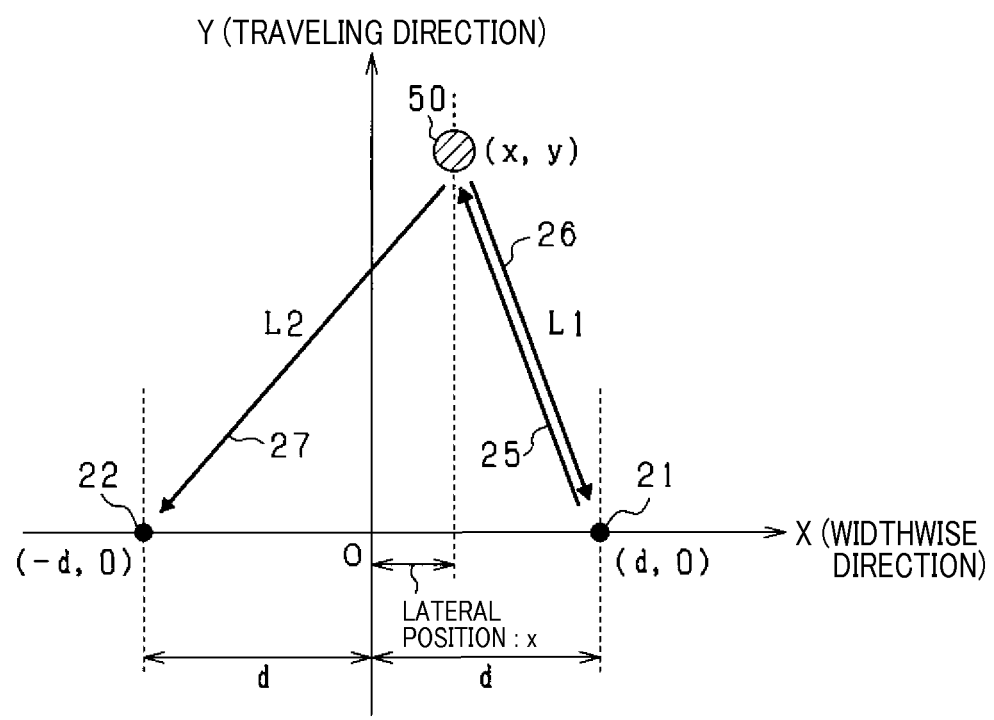
FIG. 2 is a schematic of calculating a position of an object by triangulation.

FIG. 2 is a schematic of calculating the detected relative position of the object 50, which shows the first and second center sensors 21, 22 and the object 50 in front of the first and second center sensors 21, 22 in plan view. In FIG. 2, the first center sensor 21 serves as an active sensor configured to transmit a probe wave 25 and receive a direct wave 26 that is a reflection of the probe wave 25 at a first location, and the second sensor 22 serves as a passive sensor configured to only receive an indirect wave 27 that is a reflection of the probe wave 25 transmitted by the first sensor 21 at a second location away from the first location.

The ECU 10 calculates an estimated (relative) position of the object 50 specified by X- and Y-coordinates x, y of the object 50 in a coordinate system defined by an X-axis being a straight line passing through the first and second sensors 21, 22 and a Y-axis being a straight line passing through a median between the first and second sensors 21, 22 and perpendicular to the X-axis. More specifically, in the present embodiment, the ECU 10 instructs the first center sensor (active sensor) 21 to transmit the probe wave 25. When the first center sensor 21 receives the direct wave 26 that is a reflection of the probe wave 25 from the object 50, the ECU 10 calculates a distance L1 between the first center sensor 21 and the object 50 based on the direct wave 26. When the second center sensor (passive sensor) 22 receives the indirect wave 27 that is a reflection of the probe wave 25 from the object 50, the ECU 10 calculates a distance L2 between the second sensor 22 and the object 50 based on the indirect wave 27.

A distance between an origin O of the coordinate system at which the X-axis and the Y-axis intersect and the first sensor 21 is equal to a distance between the origin O and the second sensor 22, which distances are denoted by d and stored beforehand in the ECU 10. The ECU 10 calculates a first time t1 and a second time t2, where the first time t1 is the time the direct wave 26 is received by the first sensor 21 subtracted by the time the probe wave 25 is transmitted by the first sensor 21 and the second time t2 is the time the indirect wave 27 is received by the second sensor 22 subtracted by the time the probe wave 25 is transmitted by the first sensor 21. The first time t1 multiplied by the speed of sound is twice the distance L1 between the first sensor 21 and the object 50. The second time t2 multiplied by the speed of sound is a sum of the distance L1 between the first sensor 21 and the object 50 and a distance L2 between the second sensor 22 and the object 50. The ECU 10 performs a triangulation calculation using the distance 2d between the first center sensor 21 and the second center sensor 22 and the first time t1 and the second time t2 to calculate the coordinates (x, y) of the object 50.

In the present embodiment, FIG. 2 shows an example where the first center sensor 21 serves as an active sensor and the second center sensor 22 serves as a passive sensor. Practically, coordinates of an object 50 can be calculated using any combination of adjacent sensors 21-24 in a similar manner based on the principle of triangulation. As for the ranging sensors attached to the rear portion of the vehicle 30, coordinates of an object 50 rearward of the vehicle 30 can be calculated using any combination of adjacent sensors attached to the rear portion of the vehicle 30 in a similar manner. The X-coordinate of the coordinates (x, y) of the object 50 corresponds to lateral position information.

In the present embodiment, the ECU 10 sets, as an indication of the likelihood of the object being actually present, a confidence-level determination counter N (as a degree of confidence) for each of the ranging sensors 20 based on the number of times the same object has been detected. For each of the ranging sensors 20, the confidence-level determination counter N is incremented or decremented such that as the number of times the same object has been detected by the ranging sensor increases, the confidence-level determination counter N is increased. When the confidence-level determination counter N exceeds a threshold, it is determined that the object detected by the ranging sensor is actually present around the vehicle 30, so that intervention of the interaction avoidance control is permitted. If it is determined that the object detected in the previous cycle and the object detected in the current cycle are different, the confidence-level determination counter N is reset.

An object that is outside a course of the vehicle 30 (the vehicle carrying the apparatus) is less likely to interact with the vehicle 30. Therefore, it is desirable to exempt such an object from application of the interaction avoidance control, thereby avoiding unnecessarily performance of the interaction avoidance control. In addition, when the ranging sensors 20 are used to detect an object, reflections of ultrasound waves of the ranging sensors may vary with object shapes and environments around the vehicle. Resultant variations of the reflections may cause variations in detected position of the object. Thus, despite that the position of the object calculated based on the principle of triangulation is within a range of a vehicle's course, the object may be actually out of the range of the vehicle's course. In such a case, despite no interaction avoidance control needing to be performed, such avoidance control may be unnecessarily performed.

In the present embodiment, an interaction determination process is performed, where if a position of the object detected by the ranging sensors 20 is within a range of a vehicle's course, then based on a lateral position x of the object detected by the ranging sensors 20 and the likelihood (a degree of confidence) of the object, it is determined whether or not the detected object is likely to interact with the vehicle 30. It is determined that the detected object is likely to interact with the vehicle 30, the interaction avoidance control is performed. Otherwise, that is, if it is determined that the detected object is less likely to interact with the vehicle 30, the detected object is exempted from being determined as an object for which the interaction avoidance control should be performed.

More specifically, based on a degree of confidence of the object position detected by the ranging sensors 20, an error band W that is a range of variation of the lateral position x of the object is calculated. Based on the lateral position x of the object detected by the ranging sensors 20 and the error band W, the range of variation P of the lateral position x is set. Based on a positional relationship between the range of variation P and the range of the vehicle's course, it is determined whether or not the detected object is likely to interact with the vehicle 30.

Figure 3:
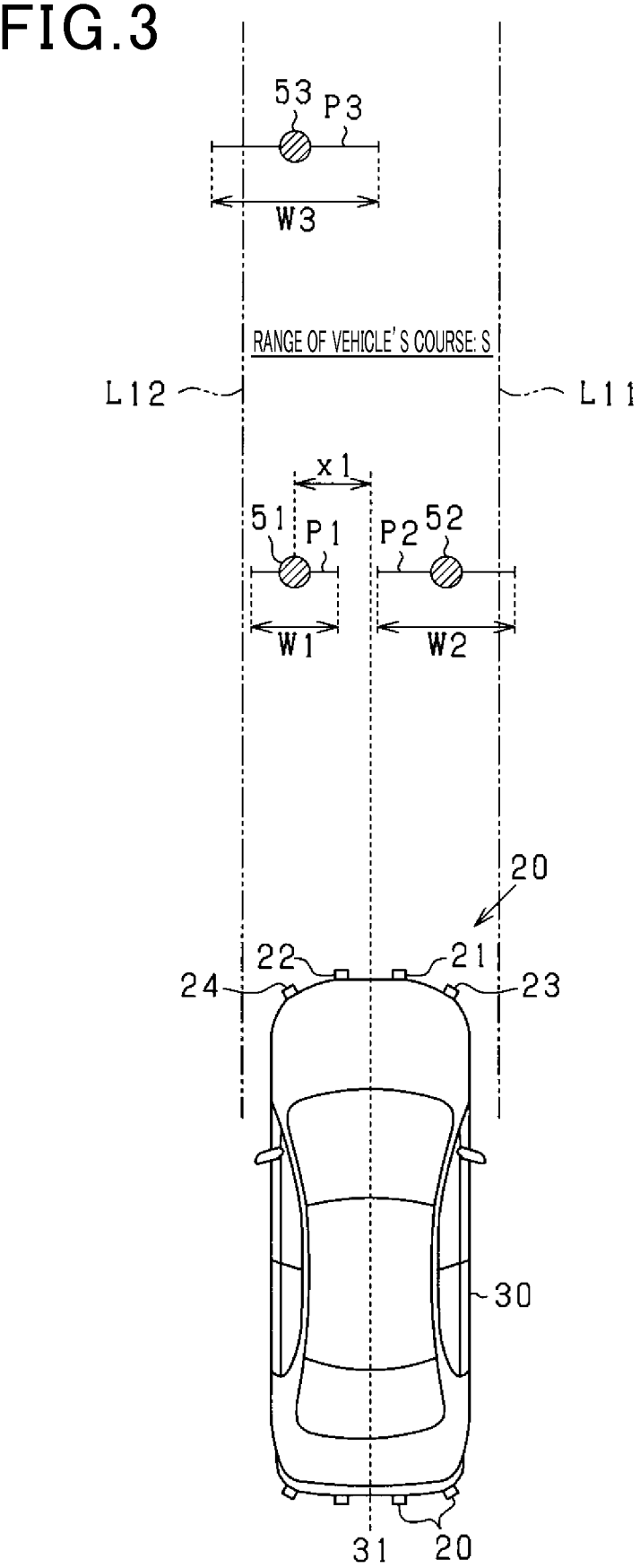
FIG. 3 is an example where an interaction determination process is performed in accordance with the first embodiment.

FIG. 3 is an example where the interaction determination process is performed in accordance with the present embodiment. In FIG. 3, the double dashed lines L11, L12 respectively extending from the left and right sides of the vehicle 30 in a vehicle's traveling direction represent boundary lines of the range of the vehicle's course. As shown in FIG. 3, the object 51 and the object 52 are at equal distances from the vehicle 30. The object 53 is farther away from the vehicle 30 than the objects 51, 52. The object 51 has a greater value of the confidence-level determination counter N, that is, a higher degree of confidence, than the objects 52, 53.

In a case where the object 51 is present forward of the vehicle 30, the error band W1 is set as a function of the current value of the confidence-level determination counter N of the object 51. A range of variation P1 centered at the lateral position x1 of the object 51 and extending in the widthwise direction of the vehicle 30 is set as a function of the error band W1. A greater value of the confidence-level determination counter N makes it more confident that the object is present at the position detected by the ranging sensors 20, allowing the error band W to be set to smaller value. That is, a greater value of the confidence-level determination counter N leads to a narrower range of variation P1. For the object 51 as shown in FIG. 3, the whole range of variation P of the lateral position x is within the range of the vehicle's course, which allows it to be determined that the object 51 is likely to interact with the vehicle 30. This triggers the interaction avoidance control to be performed to avoid interaction of the object 51 with the vehicle 30.

The object 52 has a value of the confidence-level determination counter N lower than that of the object 51, so that the error band W2 for the object 52 is set less than the error band W1. This leads to a greater range of variation P2 than the range of variation P1 for the object 51. In FIG. 3, a right end portion of the range of variation P2 resides outside the range S of the vehicle's course. In such a case, the object 52 is exempted from being determined as an object for which the interaction avoidance control should be performed.

In the present embodiment, for each detected object, a greater detected distance to the object allows the error band W to be set to a greater value. That is, as the object approaches the vehicle 30, the range of variation due to the shape of the object decreases. However, if the object continues to be detected while the vehicle 30 is in a stationary state, the confidence-level determination counter N continues to increase with increasing number of times the object has been detected. As a consequence, despite that the object is present far away from the vehicle 30, the object will be determined to have a high degree of confidence of the object position. Therefore, in the present embodiment, the error band W is set taking into account not only the confidence-level determination counter N, but also the detected distance to the object.

More specifically, the error band W3 for the object 53 is set greater than the error bands W1, W2 for the objects 51, 52. This allows the range of variation P3 for the object 53 to be set greater than range of variation P1, P2 for the objects 51, 52. In FIG. 3, a left end portion of the range of variation P3 resides outside the range S of the vehicle's course. Thus, it is determined that the object 53 is less likely to interact with the vehicle 30, so that the object 53 is exempted from being determined as an object for which the interaction avoidance control should be performed.

Figure 4A:
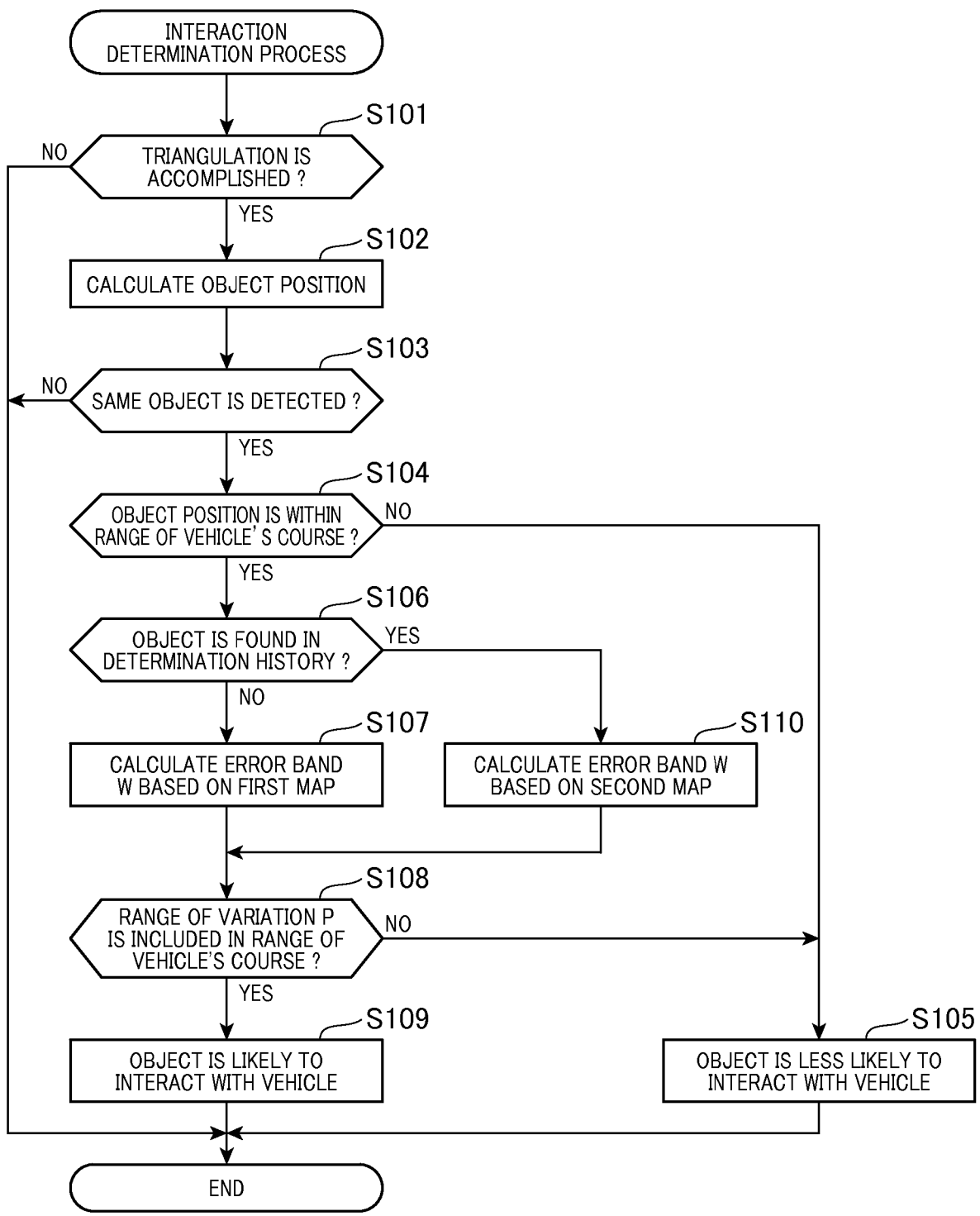
FIG. 4A is a flowchart of the interaction determination process in accordance with the first embodiment.

FIG. 4A shows a flowchart of the interaction determination process in accordance with the present embodiment. This process is performed in the ECU 10 repeatedly every predetermined time interval.

Referring to FIG. 4A, in step S101, it is determined whether or not the triangulation in the current cycle has been accomplished. For example, in the current cycle, it is determined whether or not the direct wave 26 and the indirect wave 27 have been received during a predetermined wait period after transmission of the probe wave 25 from the ranging sensor 21. The predetermined wait period may be set to, for example, tens of milliseconds. If it is determined that the direct wave 26 and the indirect wave 27 have been received during the predetermined wait period after transmission of the probe wave 25 from the ranging sensor 21, then it is determined that the triangulation in the current cycle has been accomplished. If in step S101 it is determined that the direct wave 26 and the indirect wave 27 have been received during the predetermined wait period, then the process proceeds to step S102, where based on the direct and indirect waves 26, 27, coordinates (x, y) specifying an object position are calculated according to the principle of triangulation as described with reference to FIG. 2.

Subsequently, in step S103, it is determined whether or not the object detected in the current cycle and the object detected in the last cycle is the same. This determination may be made, for example, by comparing the object position detected in the current cycle and the object position predicted based on the history of positions of the object(s) detected in the last and previous cycles. If a deviation between the current object position and the predicted object position is equal to or less than a predetermined value, then the object detected in the current cycle and the object detected in the last cycle is the same. Thereafter, the process proceeds to step S104.

In step S104, it is determined whether or not the position of the object detected by the ranging sensors 21, 22 (detected object position) is within the range of the vehicle's course. If in step S104 it is determined that the position of the object detected by the ranging sensors 21, 22 is the detected object position is out of the range of the vehicle's course, then the process proceeds to step S105, where the detected object is exempted from being determined as an object for which the interaction avoidance control should be performed.

If in step S104 it is determined that the position of the object detected by the ranging sensors 21, 22 is within the range of the vehicle's course, then the process proceeds to step S106. In step S106, it is determined whether or not the object detected by the ranging sensors 21, 22 in the current cycle is found in a determination history of determinations made in the last and previous cycles of which detected object is likely to interact with the vehicle 30. If in step S106 it is determined that the object detected by the ranging sensors 21, 22 in the current cycle is not found in the determination history, the process proceeds to step S107. In step S107, based on the degree of confidence of the detected object position and the distance D from the vehicle 30 to the detected object, the error band W for the lateral position x of the detected object is calculated. The confidence-level determination counter N is used as the degree of confidence of the detected object position. The distance D from the vehicle 30 to the detected object can be calculated based on the detections of the ranging sensors 21, 22.

Figure 5:
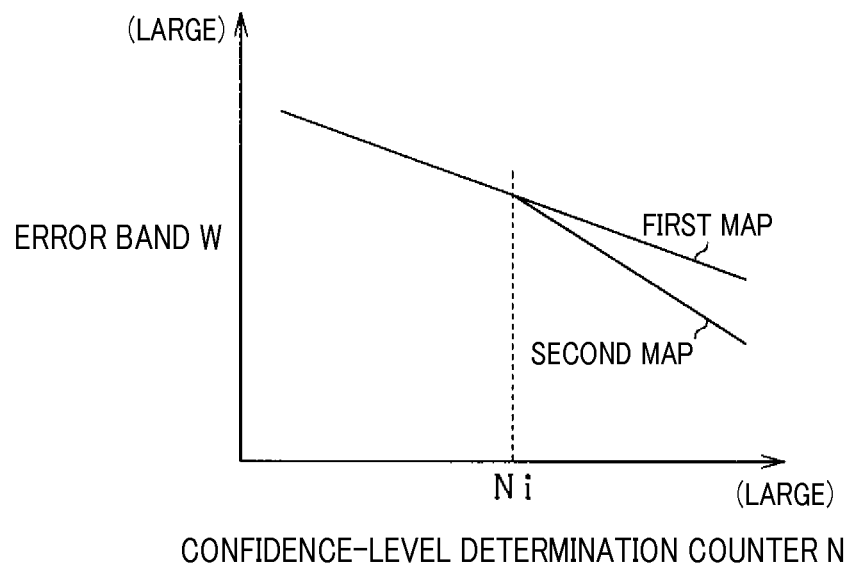
FIG. 5 is a relationship between a confidence-level determination counter and an error band in accordance with the first embodiment.
Figure 6:
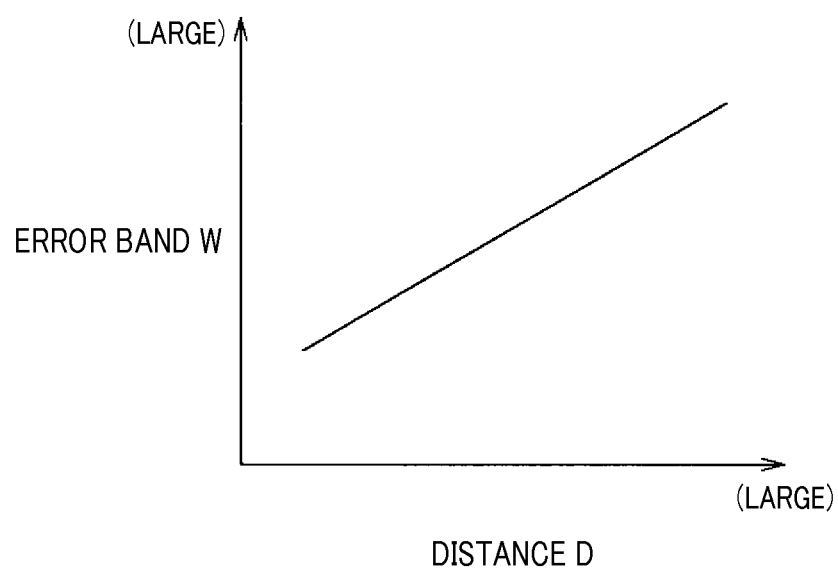
FIG. 6 is a relationship between a distance to a detected object and the error band in accordance with the first embodiment.

In the present embodiment, two-dimensional (2D) maps used to set the error band W are stored beforehand in the ECU 10, including a first 2D map representing a relationship between the error band W and the confidence-level determination counter N as shown in FIG. 5 and a second 2D map representing a relationship between the error band W and the detected distance D as shown in FIG. 6. In the first 2D map shown in FIG. 5 are shown a first map applied to each detected object that is not found in the determination history and a second map applied to each detected object that is found in the determination history. Therefore, in step S107, the error band W is calculated based on the first map.

According to the first and second maps shown in FIG. 5, the error band W is decreased with increasing confidence-level determination counter N, that is, the error band W is decreased with increasing degree of confidence of the object position. At a value of the confidence-level determination counter N equal to or greater than a predetermined value Ni, the error band W of the second map is set less than the error band W of the first map. Therefore, for example, once it is determined in the current cycle that the detected object is likely to interact with the vehicle 30, the error band W is set to a smaller value at a sufficiently high degree of confidence in the subsequent cycles, which can prevent frequently alternating determinations. FIG. 6 shows there is no difference in the relationship between the distance D and the error band W between the first and second maps. As shown in FIG. 6, the error band W is increased with increasing distance D.

Referring again to FIG. 4, in step S108, the range of variation P of the lateral position x is set based on the lateral position x and the error band W, and then it is determined whether or not the range of variation P is included in the range of the vehicle's course. In the present embodiment, it is determined whether or not the whole range of variation P is included in the range of the vehicle's course. If at least a portion of the range of the variation P is out of the range S of the vehicle's course, then the process proceeds to step S105, where the object detected in the current cycle is exempted from being determined as an object for which the interaction avoidance control should be performed. If the whole range of variation P are included in the range S of the vehicle's course, then the process proceeds to step S109, where the object detected in the current cycle is determined to be likely to interact with the vehicle 30, that is, the object detected in the current cycle is determined to be an object for which the interaction avoidance control should be performed.

In step S108 where it is determined whether or not the range of variation P is included in the range of the vehicle's course, only X-coordinates at left and right ends of the range of variation P may be calculated, and it may be determined whether or not these X-coordinates are both located within the range S of the vehicle's course. If both such X-coordinates are located within the range S of the vehicle's course, then it is determined that the range of variation P is included in the range of the vehicle's course.

Figure 4B:
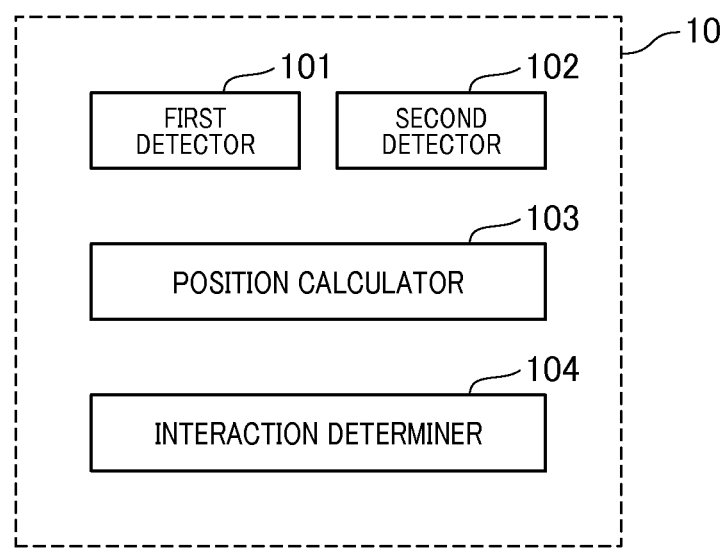
FIG. 4B is a functional block diagram of an electronic control unit in accordance with the first embodiment.

Assuming that in step S109 of a certain cycle a specific detected object is determined to be likely to interact with the vehicle 30, the same object will be determined to be found in the determination history in step S106 in the subsequent cycles and then the process will process to step S110. In step S110, using the second map of FIG. 5 the error band W is calculated based on the degree of confidence of the object position and the distance D. Thereafter, the process proceeds to step S108. Although in the present embodiment the above process has been described as being performed based on the detections of the ranging sensors 21, 22. Practically, the above process is performed for each combination of adjacent sensors (active and passive sensors) among the ranging sensors 21-24. FIG. 4B shows a functional block diagram of the ECU 10 that corresponds to the object detection apparatus of the present embodiment. The ECU 10 includes first and second detectors 101, 102, a position calculator 103 responsible for execution of step S102, an interaction determiner 104 responsible for execution of steps S104-S110. Functions of these functional blocks may be implemented by the CPU executing various programs stored in the ROM or the like.

The object detection apparatus of the present embodiment configured as above can provide the following advantages.

The error band W is calculated based on the degree of confidence of the object position. Based on a positional relationship between the range of the vehicle's course and the range of variation P of the lateral position x that is set based on the lateral position x and the error band W, it is determined whether or not the detected object is likely to interact with the vehicle 30. The error band W varies with degree of confidence (i.e., value of the confidence-level determination counter N). The range of variation P of the lateral position x varies with error band W. Addressing this concern, comparing positions of the range of the vehicle's course and the range of variation P of the lateral position x can prevent the detected object from being erroneously determined as being an object that is likely to interact with the vehicle 30.

In the present embodiment, the error band W is set using parameters including not only the degree of confidence of the object position, but also the distance D to the object. With such a configuration, even during the stationary state of the vehicle 30, it can be properly determined whether or not the detected object is likely to interact with the vehicle 30.

In the case that the object detected in the current cycle has been determined to be likely to interact the vehicle 30 in the last or previous cycle, the range of variation P of the lateral position x will be set to a smaller value in the current and subsequent cycles. More specifically, in the case that the object detected in the current cycle has been determined to be likely to interact with the vehicle 30 in the last or previous cycle, the error band W will be calculated using the second map as shown in FIG. 5 in the current and subsequent cycles, where the error band W is set to a smaller value in situations where the value of the confidence-level determination counter N is equal to or greater than the predetermined value Ni. Such a configuration can prevent frequently alternating determinations for the object detected in the current cycle having a sufficiently high degree of confidence after the same object has been determined to be likely to interact with the vehicle 30 in the last or previous cycle.

The ultrasonic sensors have a small detection error in the traveling direction of the vehicle while having a large calculation error in the widthwise direction of the vehicle, which can lead to an incorrect calculated object position. Therefore, the object detection system configured as above having the ultrasonic sensors as the ranging sensors 20 can preferably prevent the interaction avoidance control from being unnecessarily performed based on the incorrect calculated object position of the object that is actually less likely to interact with the vehicle 30.

Second Embodiment

An object detection apparatus in accordance with a second embodiment of the present invention will now be explained with reference to the accompanying drawings. In the following, only differences of the second embodiment from the first embodiment will be described. In the second embodiment, a reduced range K of a vehicle's course is set by reducing the range S of the vehicle's course in the widthwise direction of the vehicle 30 to a degree of reduction as a function of the degree of confidence of the object position detected by the ranging sensors 20. Based on a positional relationship between the reduced range K of the vehicle's course and the lateral position x of the object, it is determined whether or not the object detected by the ranging sensors 20 is likely to interact with the vehicle 30.

Figure 7:
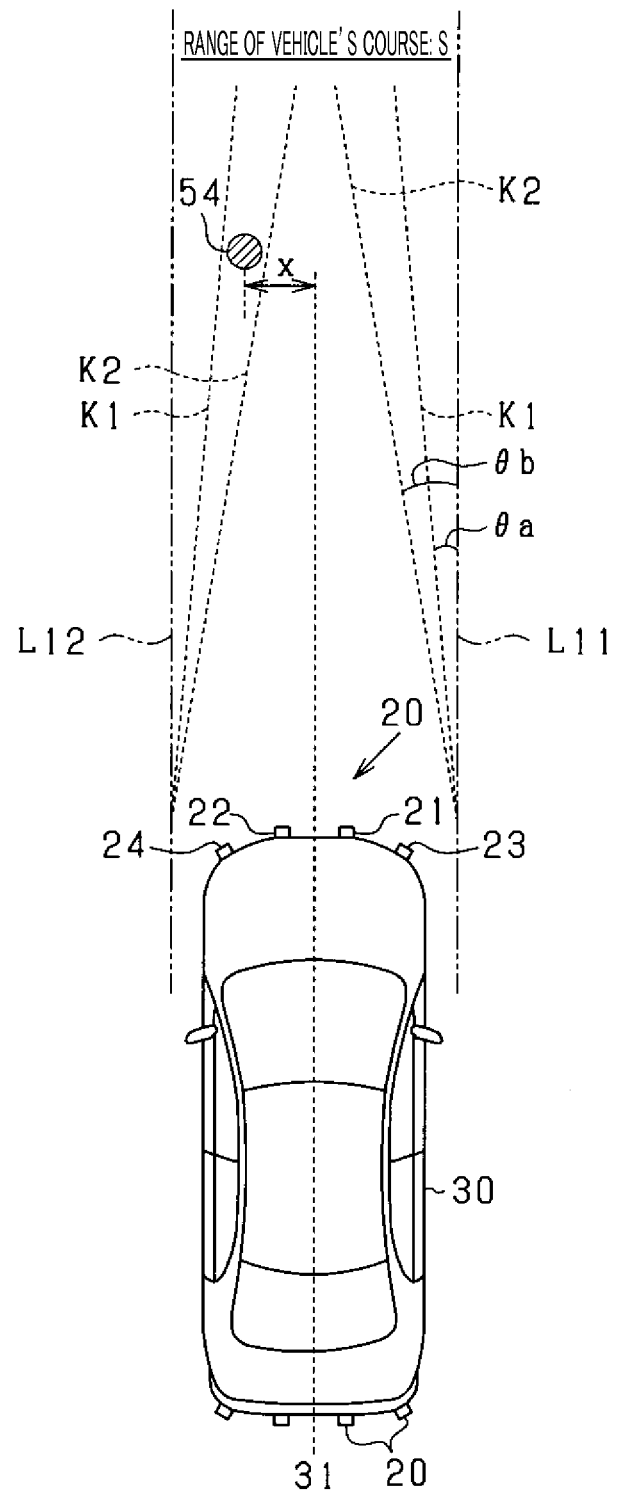
FIG. 7 is an example where an interaction determination process is performed in accordance with a second embodiment.

FIG. 7 is an example where the interaction determination process is performed in accordance with the present embodiment. In FIG. 7, the double dashed lines L11, L12 respectively extending from the left and right sides of the vehicle 30 in a vehicle's traveling direction indicate boundary lines of the range S of the vehicle's course.

In the present embodiment, the degree of reduction to which the range S of the vehicle's course is reduced in the widthwise direction of the vehicle 30 is set as a function of a current value of the confidence-level determination counter N for the object 54. In the present embodiment, the degree of reduction is set by a reduction angle $\theta$ at which the boundary lines L11, L12 are sloped toward the center line 31 of the vehicle 30. The reduced range K is an area between the slope lines K1, K2. The degree of reduction is set to a smaller value for a larger value of the confidence-level determination counter N. The reduced range K is set to a larger area for a larger value of the confidence-level determination counter N. If the position of the object 54 is within the reduced range K, it is determined that the object 54 is likely to interact with the vehicle 30, so that the interaction avoidance control is performed for the object 54. If the position of the object 54 is out of the reduced range K, it is determined that the object 54 is less likely to interact with the vehicle 30, so that the object 54 is exempted from being determined as an object for which the interaction avoidance control should be performed.

Two cases will now be compared. In a first case, the current value of the confidence-level determination counter N for the object 54 is a first value Nh. In a second case, the current value of the confidence-level determination counter N for the object 54 is a second value Nl which is less than the first value Nh. In the first case where the current value of the confidence-level determination counter N for the object 54 is the first value Nh, the reduction angle is set to a first slope angle $\theta a$. In the second case where current value of the confidence-level determination counter N for the object 54 is the second value Nl, the reduction angle is set to a second slope angle $\theta b$ that is greater than the first slope angle $\theta a$ ($\theta a < \theta b$). In FIG. 7, the object 54 is present within the reduced range between the slope lines K1, K1, in which case it is determined that the object 54 is likely to interact with the vehicle 30. Meanwhile, the object 54 is present out of the reduced range between the slope lines K2, K2, in which case the object 54 is exempted from being determined as an object for which the interaction avoidance control should be performed.

The degree of reduction is set by a reduction angle (slope angle) $\theta$ at which the boundary lines L11, L12 are sloped toward the center line 31 of the vehicle 30, which allows a width of the reduced range K to be set as a function of the distance D to the detected object. More specifically, the range of the vehicle's course can be reduced in the widthwise direction of the vehicle 30 with increasing distance D to the detected object. As the distance D to the detected object increases, the detected object is less prone to be determined to be likely to interact with the vehicle 30.

Figure 8A:
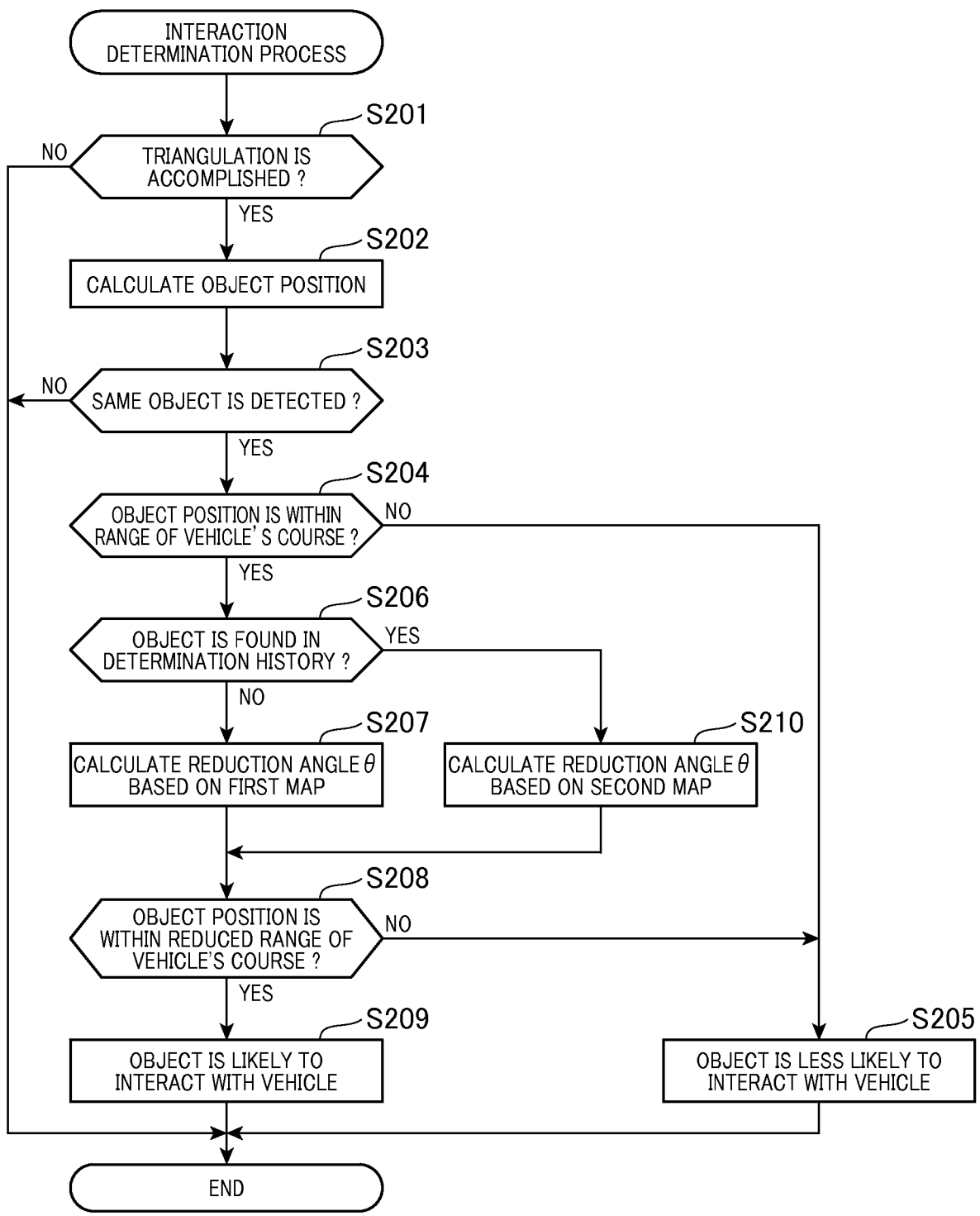
FIG. 8A is a flowchart of the interaction determination process in accordance with the second embodiment.

FIG. 8A shows a flowchart of an interaction determination process in accordance with the present embodiment. This process is performed in the ECU 10 repeatedly every predetermined time interval.

In FIG. 8A, in steps S201-S206, the same operations are performed as the operations in steps S101-S106 in FIG. 4A. If in step S206 it is determined that the detected object is not found in the determination history, then the process proceeds to step S207, where the reduction angle $\theta$ is set as a function of the degree of confidence of the detected object position. In the present embodiment, a reduction-degree setting map representing a relationship between the confidence-level determination counter N and the reduction angle $\theta$ is stored beforehand in the ECU 10. In the reduction-degree setting map are shown a first map applied to each detected object that is not found in the determination history and a second map applied to each detected object that is found in the determination history. In step S207, the first map is selected and used to set the reduction angle $\theta$.

Figure 9:
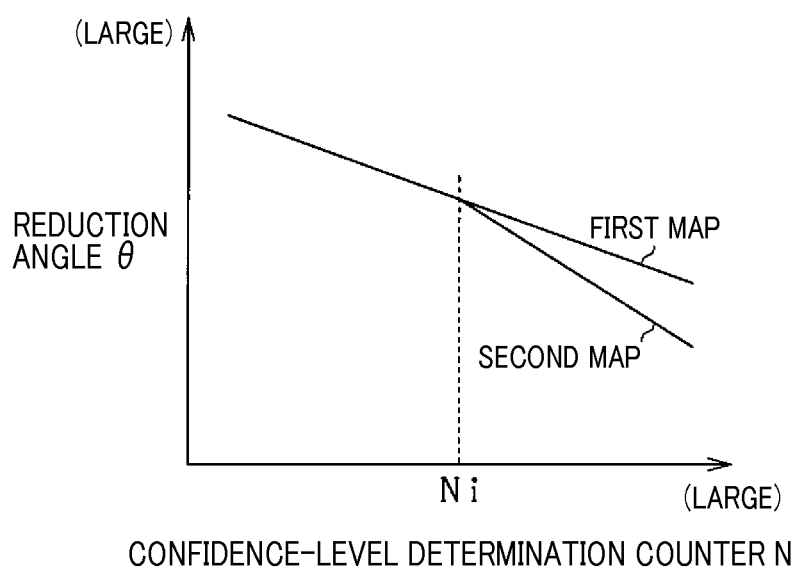
FIG. 9 is a relationship between the confidence-level determination counter and reduction angle in accordance with the second embodiment.

FIG. 9 shows the relationship between the confidence-level determination counter N and the reduction angle $\theta$. In FIG. 9, the reduction angle $\theta$ is decreased with increasing confidence-level determination counter N (i.e., increasing degree of confidence). At a value of the confidence-level determination counter N equal to or greater than the predetermined value Ni, the reduction angle $\theta$ of the second map is set less than the reduction angle $\theta$ of the first map, which can prevent frequently alternating determinations.

Referring back to FIG. 8, in step S208, the reduced range K is set to an area between the slope lines K1, K2 respectively sloped toward the center line 31 of the vehicle 30 at a reduction angle $\theta$ to boundary lines L11, L12 of the range of the vehicle's course, and then it is determined whether or not the object position calculated in the current cycle is within the reduced range K. If in step S208 it is determined that the object position calculated in the current cycle is out of the reduced range K, then the process proceeds to step S205, where it is determined that the object detected in the current cycle is less likely to interact with the vehicle 30 and thus exempted from being determined as an object for which the interaction avoidance control should be performed. If in step S208 it is determined that the object position calculated in the current cycle is within the reduced range K, then the process proceeds to step S209, where it is determined that the object detected in the current cycle is likely to interact with the vehicle 30, that is, it is determined that the interaction avoidance control should be performed for the object detected in the current cycle.

Figure 8B:
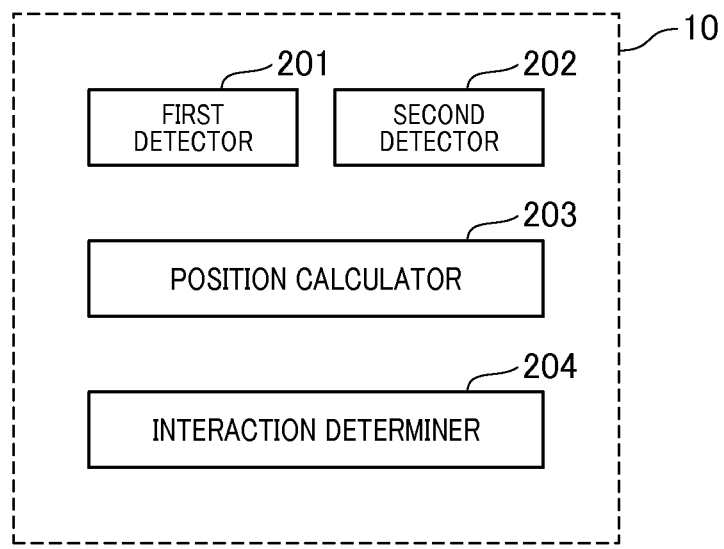
FIG. 8B is a functional block diagram of the electronic control unit in accordance with the second embodiment.

If in step S209 it is determined that the object detected in the current cycle is likely to interact with the vehicle 30, then in the respective subsequent cycles it will be determined in step S206 that the detected object is found in the determination history. Thereafter the process proceeds to step S210, where using the second map (see FIG. 9) the reduction angle $\theta$ is set based on the degree of confidence of the detected position. Subsequently, the process proceeds to step S208. As in the first embodiment, the above process is performed for each combination of adjacent sensors (active and passive sensors) among the ranging sensors 21-24. FIG. 8B shows a functional block diagram of the ECU 10 that corresponds to the object detection apparatus of the present embodiment. The ECU 10 includes first and second detectors 201, 202, a position calculator 203 responsible for execution of step S202, an interaction determiner 204 responsible for execution of steps S204-S210. Functions of these functional blocks may be implemented by the CPU executing various programs stored in the ROM or the like.

In the second embodiment, the reduced range K of the vehicle's course is set by reducing the range S of the vehicle's course in the widthwise direction of the vehicle 30 to the degree of reduction as a function of the degree of confidence of the detected object position. Based on a positional relationship between the reduced range K of the vehicle's course and the lateral position x of the object, it is determined whether or not the object detected by the ranging sensors 20 is likely to interact with the vehicle 30. That is, in the present embodiment, Instead of acquiring the range of variation P of the lateral position x of the detected object, reducing the range S of the vehicle's course according to the degree of confidence of the object position can prevent the object that is less likely to interact with the vehicle 30 from being incorrectly determined as being an object for which the interaction avoidance control should be performed.

If the object detected in the current cycle has been determined to be likely to interact with the vehicle 30 in the last or previous cycle, the reduced range K is set larger than the reduced range K set before the same object is determined to be likely to interact with the vehicle 30. More specifically, if the object detected in the current cycle has been determined to be likely to interact with the vehicle 30 in the last or previous cycle, the reduction angle θ is calculated using the second map (see FIG. 9), which allows the reduction angle θ to be set to a smaller value according to the degree of confidence in situations where the value of the confidence-level determination counter N is equal to or greater than the predetermined value Ni. Such a configuration can prevent frequently alternating determinations for the object detected in the current cycle having a sufficiently high degree of confidence after the same object has been determined to be likely to interact with the vehicle 30 in the last or previous cycle.

Other Embodiments

There will now be explained some other embodiments that may be devised without departing from the spirit and scope of the present invention.

(i) In the first embodiment, the error band W is calculated based on the degree of confidence of the object position and the distance D from the vehicle 30 to the detected object. Alternatively, the error band W may be calculated based on the degree of confidence of the object position alone. In the second embodiment, instead of using the reduction angle θ, a sliding distance by which the boundary lines L11, L12 may be slided toward the center line 31 of the vehicle 30 may be used to set the reduced range K. In such an embodiment, the sliding distance may be increased with decreasing degree of confidence of the object position.

(ii) In an alternative embodiment to the first or second embodiment described as above, the error band W or the degree of reduction of the range of the vehicle's course may be variably set as a function of parameters of the ambient environment around the vehicle 30. The reflections of the ultrasonic wave transmitted by the ranging sensor (as an active sensor) 20 may vary depending upon parameters of the ambient environment around the vehicle 30, such as an outside air temperature, a humidity, and a wind strength and others, which may cause detection errors to vary with the parameters of the ambient environment around the vehicle 30. More specifically, the higher outside air temperature, the higher humidity, or the higher wind strength will weaken the reflections. Thus, the weakened reflections of the ultrasonic wave will cause the detection errors to increase. Addressing this concern, in such an alternative embodiment, erroneous determinations due to the detection errors caused by the ambient environment can be preferably prevented.

(iii) In the above embodiments, the interaction determination process is configured such that, if the object position actually detected by the ranging sensors 20 is within the range of the vehicle's course, then based on the lateral position x of the object actually detected by the ranging sensors 20 and the degree of confidence of the detected object position, it is determined whether or not the detected object is likely to interact with the vehicle 30. Alternatively, instead of using the object position actually detected by the ranging sensors 20, an object position that is predicted based on the detections in the last and previous cycles may be used as an object position in the next cycle. That is, if the predicted object position is within the range of the vehicle's course, it is determined whether or not the object is likely to interact with the vehicle 30 based on the predicted lateral position x and the degree of confidence of the detected object position. Such a configuration allows the interaction determination process to be performed with a calculation period being less than an object detection period by the ranging sensors 20.

(vi) In the first or second embodiment, the error band W or the degree of reduction to which the range of the vehicle's course is reduced in the widthwise direction of the vehicle 30 is set according to the first or second map depending on whether or not the detected object can be found in the determination history. Alternatively, whether or not the detected object can be found in the determination history, the error band W or the degree of reduction of the range of the vehicle's course may be set according to the same map.

(v) In the first and second embodiments, the confidence-level determination counter N as an indication of the degree of confidence of the object position is incremented or decremented for each of the ranging sensors 20. Alternatively, the confidence-level determination counter N may be a single counter shared by the ranging sensors 20.

(vi) In the first and second embodiments, the ranging sensors 20 are attached to the front and rear portions of the vehicle 30 to detect an object around the vehicle 30. Alternatively or additionally, the ranging sensors 20 may be attached to the right- and left-side surface portions of the vehicle 30 to detect an object around the vehicle 30.

(vii) In the first and second embodiments, the ranging sensors 20 are ultrasonic sensors adapted to use an ultrasonic wave as a probe wave to detect an object. Alternatively, the ranging sensors 20 may be any other sensors capable of transmitting a probe wave and receive a reflection of the probe wave to thereby detect an object. The ranging sensors 20 may include millimeter-wave radar or laser radar or the like adapted to use an electromagnetic wave to detect an object.

(viii) In the first and second embodiments, the object detection apparatus is mounted in the vehicle. Alternatively, the object detection apparatus may be mounted in a moving object other than the vehicle, such as an airplane, a ship, a robot or the like.

What is claimed is:

1. An object detection apparatus for detecting an object around a moving object with a plurality of ranging sensors attached to the moving object by transmitting a probe wave and receiving reflections of the probe wave from the object via the plurality of ranging sensors, the apparatus comprising:

a first detector configured to detect the object based on a direct wave that is a first reflection of the probe wave from the object, the probe wave and the first reflection being respectively transmitted and received by the same ranging sensor that is a first ranging sensor that is one of the plurality of ranging sensors;

a second detector configured to detect the object based on an indirect wave that is a second reflection of the probe wave from the object, the second reflection being received by a second ranging sensor that is another one of the plurality of ranging sensors;

a position calculator configured to calculate an object position as a position of the object based on the detections of the first and second detectors according to the principle of triangulation;

an interaction determiner configured to, as a result of the object position calculated by the position calculator being within a range of a course of a moving object, determine whether or not the detected object is likely to interact with the moving object based on a lateral position of the detected object and a degree of confidence of the object position calculated by the position calculator, the lateral position of the detected object being the object position calculated by the position calculator in a direction perpendicular to a moving direction of the moving object, wherein the interaction determiner is configured to, based on the degree of confidence of the calculated object position, set a range of variation of the lateral position of the detected object within which the lateral position of the detected position varies, and based on a positional relationship between the range of variation of the lateral position and the range of the course of the moving object, determine whether or not the detected object is likely to interact with the moving object, wherein the interaction determiner is configured to set a smaller range of variation of the lateral position of the detected object in a current cycle relative to a previous cycle based on the interaction determiner determining that the detected object is likely to interact with the moving object in the previous cycle.

2. An object detection apparatus for detecting an object around a moving object with a plurality of ranging sensors attached to the moving object by transmitting a probe wave and receiving reflections of the probe wave from the object via the plurality of ranging sensors, the apparatus comprising:

a first detector configured to detect the object based on a direct wave that is a first reflection of the probe wave from the object, the probe wave and the first reflection being respectively transmitted and received by the same ranging sensor that is a first ranging sensor that is one of the plurality of ranging sensors;

a second detector configured to detect the object based on an indirect wave that is a second reflection of the probe wave from the object, the second reflection being received by a second ranging sensor that is another one of the plurality of ranging sensors;

a position calculator configured to calculate an object position as a position of the object based on the detections of the first and second detectors according to the principle of triangulation;

an interaction determiner configured to, in response to the object position calculated by the position calculator being within a range of a course of a moving object, determine whether or not the detected object is likely to interact with the moving object based on a lateral position of the detected object and a degree of confidence of the object position calculated by the position calculator, the lateral position of the detected object being the object position calculated by the position calculator in a direction perpendicular to a moving direction of the moving object, wherein the interaction determiner is configured to set a reduced range of the course of the moving object by reducing the range of the course of the moving object to a degree of reduction as a function of the degree of confidence in the direction perpendicular to the moving direction of the moving object, and based on a positional relationship between the reduced range of the course of the moving object and the lateral position of the detected object, determine whether or not the detected object is likely to interact with the moving object.

3. The apparatus of claim 2, wherein the interaction determiner is configured to, in response to the detected object in a current cycle being determined to be likely to interact with the moving object in a last or previous cycle, set the reduced range of the course of the moving object by reducing the range of the course of the moving object to a higher degree of reduction than before the detected object is determined to be likely to interact with the moving object in the last or previous cycle.

4. The apparatus of claim 1, wherein the position calculator is configured to, based on receipt times of the reflections from the object, calculate a distance to the object in a moving direction of the moving object, and the interaction determiner is configured to, in response to the object position calculated by the position calculator being within the range of the course of the moving object, determine whether or not the detected object is likely to interact with the moving object based on the lateral position of the detected object, the degree of confidence of the calculated object position, and the distance to the detected object calculated by the position calculator.

5. The apparatus of claim 1, wherein each of the plurality of ranging sensors is an ultrasonic sensor capable of transmitting an ultrasonic wave as the probe wave.

6. The apparatus of claim 1, wherein the first and second ranging sensors are a pair of adjacent ranging sensors.

7. The apparatus of claim 1, wherein the moving object is a vehicle, and the apparatus is mounted in the vehicle.

8. The apparatus of claim 2, wherein the position calculator is configured to, based on receipt times of the reflections from the object, calculate a distance to the object in a moving direction of the moving object, and the interaction determiner is configured to, in response to the object position calculated by the position calculator being within the range of the course of the moving object, determine whether or not the detected object is likely to interact with the moving object based on the lateral position of the detected object, the degree of confidence of the calculated object position, and the distance to the detected object calculated by the position calculator.

9. The apparatus of claim 2, wherein each of the plurality of ranging sensors is an ultrasonic sensor capable of transmitting an ultrasonic wave as the probe wave.

10. The apparatus of claim 2, wherein the first and second ranging sensors are a pair of adjacent ranging sensors.

11. The apparatus of claim 2, wherein the moving object is a vehicle, and the apparatus is mounted in the vehicle.

12. The apparatus of claim 2, wherein the range of variation of the lateral position of the detected object is a lateral error bar centered about the lateral position of the detected object.

* * * * *